United States Patent [19]
Dupuis, Jr.

[11] 3,713,335
[45] Jan. 30, 1973

[54] CONTROL APPARATUS
[75] Inventor: Thomas E. Dupuis, Jr., Dallas, Tex.
[73] Assignee: Honeywell, Inc., Minneapolis, Minn.
[22] Filed: April 1, 1969
[21] Appl. No.: 811,896

[52] U.S. Cl................................73/178 R, 33/226 Z
[51] Int. Cl. ............................................G01c 21/18
[58] Field of Search...33/226 Z; 73/178, 504; 74/5.4, 74/5.22

[56] References Cited

UNITED STATES PATENTS 3,238,795  3/1966  Greenberg et al...................74/5.4 X
2,985,023  5/1961  Weiss et al.......................33/226 UX Primary Examiner—Donald O. Woodiel
Attorney—Charles J. Ungemach, Ronald T. Reiling and James A. Phillips

[57] ABSTRACT

A secondary control loop or compensation loop for compensating for mechanical errors of an inertial component is shown. The inertial component has a first torquer winding and a second torquer winding with the first torquer winding being used in a rebalance loop in the usual manner. The second torquer winding is driven by pulse circuits in response to logic signals derived from the various inertial components on the same platform. The pulses used to drive the second torquer winding are weighted to compensate for mechanical inaccuracies and errors in the inertial component attached thereto.

4 Claims, 6 Drawing Figures

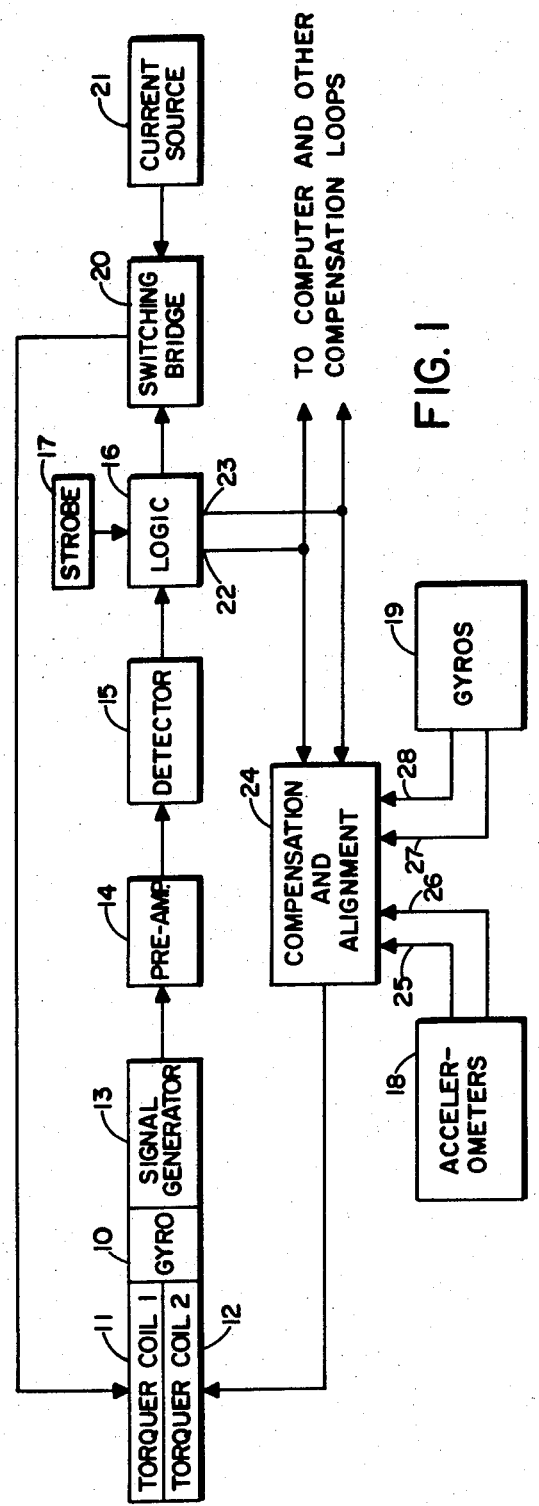
FIG. 1
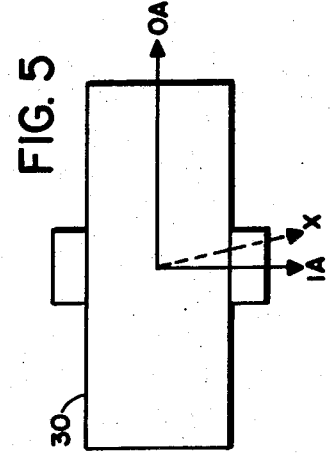
FIG. 5
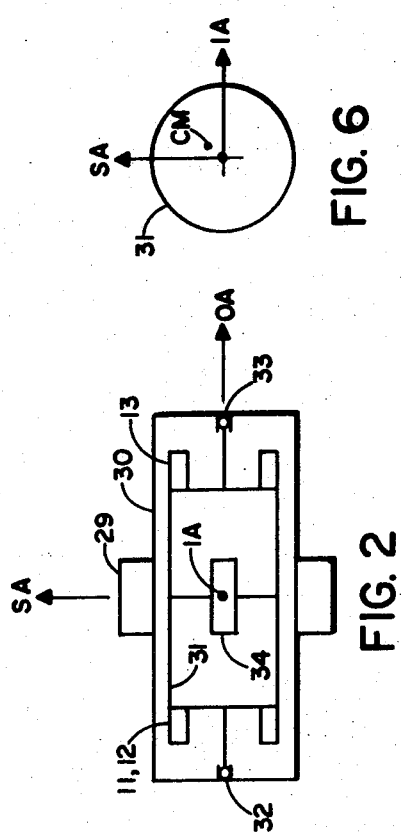
FIG. 6
FIG. 2
INVENTOR.
THOMAS E. DUPUIS JR.
BY Robert E. Walroth
ATTORNEY

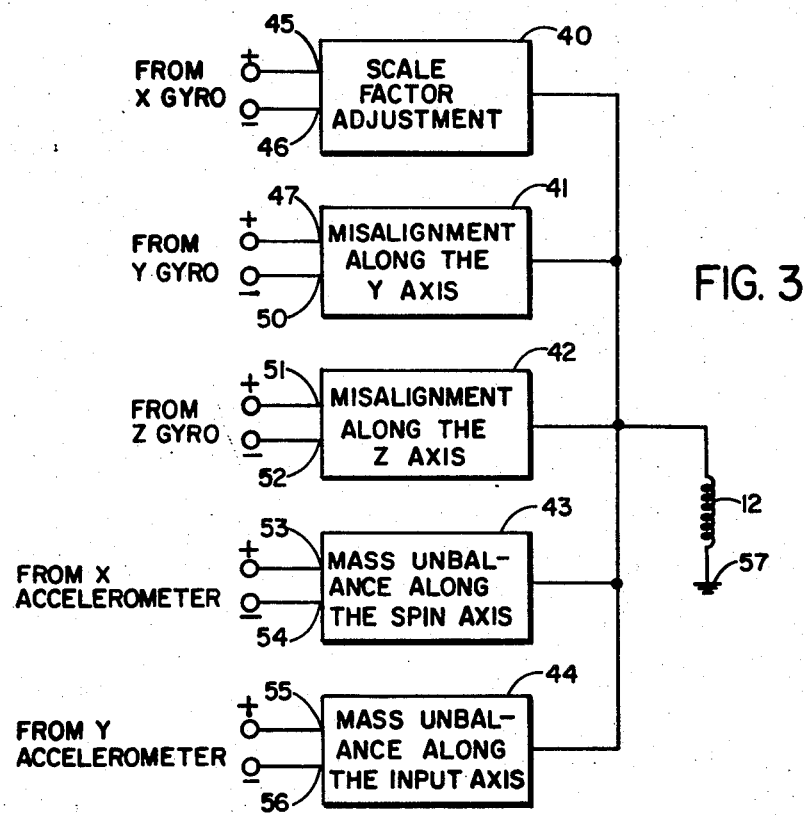
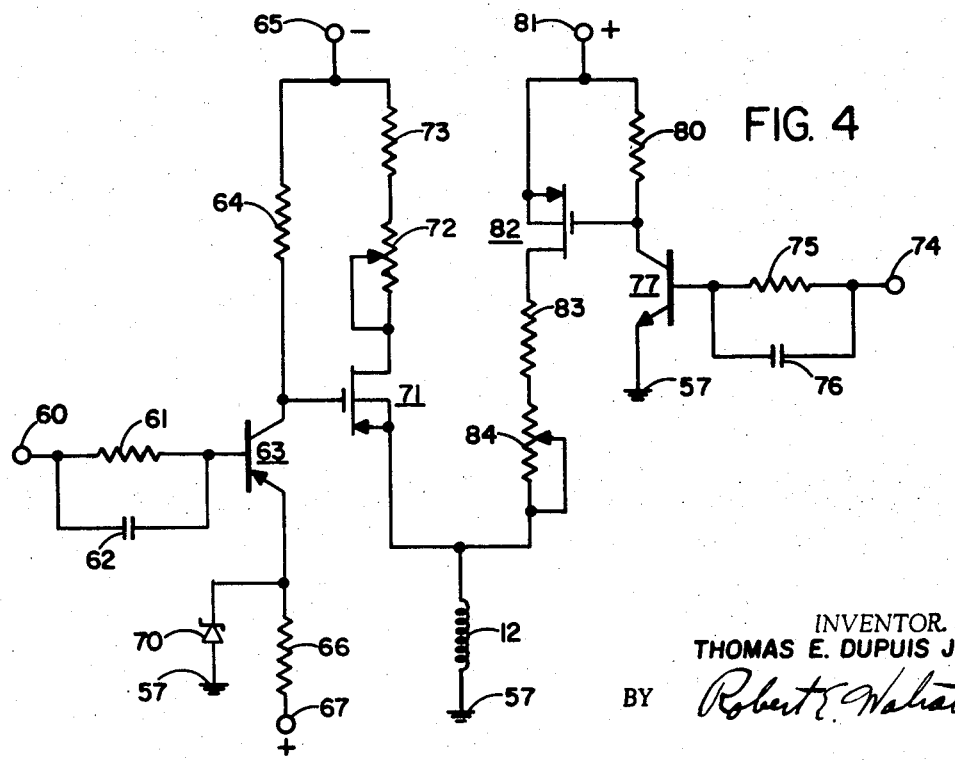

3,713,335

CONTROL APPARATUS

BACKGROUND OF THE INVENTION

In the past there have been many attempts to improve the accuracy of inertial navigation systems. The primary direction taken was to improve the mechanical precision of the inertial components and the accuracy of the associated electronics. While this approach led to quite precise inertial components, it also greatly increased the cost of such components. In many cases there is a need for the accuracy provided by precision inertial components, but the expense of such inertial components is so high that the user cannot afford them. Of course, it was always possible to produce low-cost inertial components, however, such components were generally not accurate enough for the user's purpose. Various schemes have been proposed in the prior art for improving the accuracy of components which potentially could be used with less precise inertial components, however, many of these schemes relied on such elaborate systems that the ultimate cost was still too high.

One successful technique for lowering the cost of inertial components was to build low-cost inertial components with a second or secondary torquer winding. The second torquer winding was then used for compensating for mechanical inaccuracies of the inertial component. This approach is successful only if the cost of the compensation electronics is also kept low so that the system costs remain low. In general, analog compensation schemes have been used, however, problems were encountered due to DC amplifier drift and other sources of error which potentially could produce errors greater than those being compensated.

SUMMARY OF THE INVENTION

This invention pertains to electronic circuitry for compensating for mechanical inaccuracies of an inertial component. More particularly, this invention pertains to electronic circuitry which uses digital or pulse techniques to compensate for inaccuracies or errors in an inertial component.

In general, a navigation system includes a platform with gyroscopes and/or accelerometers mounted thereon to sense conditions such as angular rate or displacement and/or acceleration in a three-axis coordinate system. In a strap-down system, for example, three accelerometers and three gyroscopes (gyros) may be mounted on an inertial platform to sense acceleration and angular displacement of the platform in the three-axis coordinate system. Each of the inertial components has its input axis oriented in an X, Y, or Z direction. If there is a mechanical inaccuracy in the orientation of one of the various components, that component will provide an output signal when there is an input in a direction orthogonal to its input axis at which time the component should not be providing an output signal. Since there is another component sensing the input, its output signal, when properly scaled, can be used as a correction factor to electrically correct for the mechanical misalignment of the input axis of the misaligned component.

Similarly, mass unbalance of the gimbal creates torques about the output axis which cause inaccuracies. These torques are caused by forces due to acceleration acting on the mass unbalance, and the output signal of the accelerometers is thus a measure of the torque produced by the unbalance of the gimbal. Properly scaled output signals from the accelerometers can be used to compensate for this extraneous torque. Other extraneous torques or errors may be generated by the flex leads and nonlinearities in the inertial component which can be compensated by using properly scaled output signals from the same inertial component.

A compensation loop constructed in accordance with this invention includes one or more pulse circuits which produce properly scaled pulses in response to the output signals from one or more of the inertial components on the platform. The pulses so generated are applied to the second torquer coil of the inertial component to be compensated.

Accordingly, it is an object of this invention to provide novel electronic compensation apparatus for compensating for mechanical inaccuracies of inertial components.

It is a further object of this invention to provide a novel compensation apparatus for inertial components which uses pulse or digital techniques.

Further objects and advantages of this invention will become evident to those skilled in the art upon a reading of this specification and appended claims in conjunction with the drawings.

BRIEF DESCRIPTION OF THE DRAWINGS

FIG. 1 is a block diagram of one example of a rebalance loop and compensation loop for a gyro.

FIG. 2 is a schematic diagram of a gyro.

FIG. 3 is a block diagram of the pulse circuits in the compensation loop.

FIG. 4 is a schematic diagram of a pulse circuit.

FIG. 5 is a schematic diagram to illustrate misalignment of the input axis of a gyro.

FIG. 6 is a schematic diagram to illustrate mass unbalance of the gimbal of a gyro.

STRUCTURE OF FIG. 1

In FIG. 1 there is shown an inertial component, inertial instrument, or gyroscope (gyro) 10 for measuring a condition such as angular displacement or rate, acceleration or velocity. Gyro 10 has associated with it a first force producing means or first or primary torquer coil or winding 11; a second force producing means or second, secondary, or auxiliary torquer coil or winding 12; and a signal generator or pickoff 13. An output of signal generator 13 is connected to a pre-amplifier 14 which has an output connected to a detector 15. An output of detector 15 is connected to a logic circuit 16. A strobe or clock 17 has an output connected to logic circuit 16. Logic circuit 16 has an output connected to a switching bridge or circuit 20. A regulated current source 21 provides a current to switching bridge 20 which has an output connected to the first torquer coil 11. Pre-amplifier 14, detector 15, logic circuit 16, switching bridge 20, aND their associated circuitry comprise a rebalance loop for gyro 10.

Logic circuit 16 further has first and second logic outputs 22 and 23 which are connected to first and second inputs of a compensation and alignment circuit 24. Outputs 22 and 23 of logic circuit 16 are further connected to two terminals for connection to a computer and to the compensation and alignment loops of other inertial components. The outputs of corresponding logic circuits of other inertial components are similarly connected to compensation and alignment circuit 24. These connections are illustrated by the connections from accelerometers 18 to inputs 25 and 26 and from gyros 19 to inputs 27 and 28 of compensation and alignment circuit 24. Accelerometers 18 and gyros 19 are the other inertial components in the system.

A schematic diagram of a integrating rate gyro of a type commonly used in strap-down systems in shown in FIG. 2. The gyro has a housing 30 with a mounting flange 29 attached thereto. A gimbal 31 is mounted on housing 30 and pivoted on bearings 32 and 33. A rotor 34 is mounted inside of the gimbal to rotate with the gimbal. The torquer coils 11 and 12 are mounted on one end of the gimbal. The torquer coils may be the same as a standard gyro torquer except that two coils are used instead of one. Pickoff 13 is mounted on the other end of the gimbal. The axis of rotation of the gimbal is the output axis (OA). The axis about which the rotor rotates in is the spin axis (SA). The third axis is the input axis (IA) which is mutually perpendicular to the output axis and spin axis.

A integrating rate gyro measures the angular rate about the input axis. The angular rate about the input axis causes the gimbal to precess about the output axis. The precession of gimbal 31 causes pickoff 13 to provide an output signal. This output signal is amplified by pre-amplifier 14. Detector 15 and logic circuit 16 generate logic pulses in accordance with the polarity or sense and amplitude of the output signal from pre-amplifier 14. The logic pulses from logic circuit 16 operate switching bridge 20 to provide pulses of current to torquer coil 11. Torquer coil 11 produces a force on gimbal 31 to drive gimbal 31 back to its null position. Various pulsing schemes are known in the art. One such scheme is called pulsed-on-demand torquing where logic circuit 16 provides pulses to switching bridge 20 when the signal from signal generator 13 exceeds a predetermined threshold. The rate of the rebalance pulses depends upon the amplitude or rate of change of the signal from signal generator 13. Logic circuit 16 provides similar pulses at outputs 22 or 23 depending upon the direction of change, polarity, or sense of the signal from signal generator 13.

The gyro illustrated schematically in FIG. 2 is a integrating rate gyro which measures angular rate about the input axis. The gyro, however, may also integrate so that it in effect measures angular displacement. Since the rate or angle of precession of the gimbal is proportional to the angular rate or displacement about the input axis, the output signal provided by pickoff 13 is proportional to the angular rate or angular displacement about the input axis. Since the purpose of the rebalance loop is to drive the gyro back to null, the rate or number of current pulses required to drive the gyro to null is a measure of the angular rate or angular displacement. Logic circuit 16 provides logic output signals at outputs 22 and 23 which are coupled to a computer which derives navigational information from the logic output signals. The logic output signals provided at outputs 22 and 23 are also coupled to compensation and alignment circuit 24. Two outputs are shown in account for both plus an minus precession of the gimbal. Other signal schemes may also be used. These logic signals are used in a manner which will be described hereinafter to pulse torquer coil 12 to provide compensation for mechanical inaccuracies in inertial component 10.

In a strap-down inertial system, normally three gyros are mounted on the inertial platform. The gyros measure angular rate or displacement about three mutually perpendicular axes. There are also three accelerometers which measure acceleration about three mutually perpendicular axes. Each of these inertial components has a rebalance loop similar to the one illustrated in FIG. 1. The logic output signals from each of the inertial components can be used to correct or compensate for various mechanical inaccuracies of each inertial component. The plurality of inputs 25-28 of compensation and alignment circuit 24 are therefore connected to the rebalance loops of the various other inertial components mounted on the same plateform.

STRUCTURES OF FIGS. 3 AND 4

For the description of FIGS. 3 and 4 assume that inertial component 10 is the X gyro. Those skilled in the art will realize that any of the three gyros or three accelerometers in a typical inertial platform may be compensated in the same manner or in a similar manner as the X gyro is compensated.

In FIG. 3 blocks 40, 41, 42, 43, and 44 are shown. Block 40, labeled "scale factor adjustment," has inputs 45 and 46. Inputs 45 and 46 are connected to outputs 22 an 23 of logic circuit 16 of FIG. 1. Block 41, labeled "misalignment along the Y axis," has inputs 47 and 50. Inputs 47 and 50 are connected to outputs of the Y gyro rebalance loop corresponding to outputs 22 and 23 of logic circuit 16. Block 42, labeled "misalignment along the Z axis," has inputs 51 and 52. Inputs 51 and 52 are connected to outputs of Z gyro rebalance loop equivalent to outputs 22 and 23 of logic circuit 16. Block 43, labeled "mass unbalance along the spin axis," has inputs 53 and 54. Inputs 53 and 54 are connected to outputs of the X accelerometer rebalance loop equivalent to outputs 22 and 23 of logic circuit 16. Block 44, labeled "mass unbalance along the input axis," has inputs 55 and 56. Inputs 55 and 56 are connected to outputs of the Y accelerometer rebalance loop equivalent to outputs 22 and 23 of logic circuit 16. At this point it should be noted that the rebalance loops of each of the accelerometers and gyros mounted on the platform may be the same or similar or may be different. The only requirement is that each of the rebalance loops provide at some point a logic or pulse signal indicative of the condition being sensed by that inertial component.

Each of the blocks 40-44 has an output connected to one end of torquer coil 12, the other end of which is connected to a common conductor or ground 57. All of the outputs of blocks 40-44 can be tied directly together since torquer coil 12 is a low impedance load and the interaction between the outputs of the various blocks will be negligible.

FIG. 4 shows a pulse forming means or pulse circuit suitable for use in blocks 40-44. A first input terminal 60 is connected by means of a parallel combination of a resistor 61 and a capacitor 62 to the base of a switching means or PNP transistor 63. The collector of transistor 63 is connected to one end of a resistor 64, the other end of which is connected to negative potential source 65. The emitter of transistor 63 is connected to one end of a resistor 66, the other end of which is connected to a positive potential source 67. The emitter of transistor 63 is further connected to the cathode of a zener diode 70, the anode of which is connected to ground 57. The collector of transistor 63 is further connected to the control means or gate of a switch means, transistor means, or insulated-gate field-effect transistor (FET) 71. The drain of FET 71 is connected to one end of an adjustable means or potentiometer 72, the other end of which is connected to one end of a resistor 73. The other end of resistor 73 is connected to potential source 65. The source of transistor 71 is connected to one end of torquer coil 12, the other end of which is connected to ground 57. Torquer coil 12 is the same in FIGS. 1, 3, and 4. Transistor 63, FET 71, and their associated circuitry comprise a first pulse forming means or pulse circuit.

A second input terminal 74 is connected by means of a parallel combination of a resistor 75 and a capacitor 76 to the base of a switch means or NPN transistor 77. The emitter of transistor 77 is connected to ground 57. The collector of transistor 77 is connected to one end of a resistor 80, the other end of which is connected to a positive potential source 81. The collector of transistor 77 is further connected to the control means or gate of a switch means, transistor means, or insulated-gate FET 82. The source of FET 82 is connected to potential source 81. The drain of FET 82 is connected to one end of a resistor 83, the other end of which is connected to one end of an adjustable means or potentiometer 84. The other end of potentiometer 84 is connected to the source of FET 71 (and hence to one end of torquer coil 12). Transistor 77, FET 82, an their associated circuitry comprise a second pulse forming means or pulse circuit.

OPERATION OF FIG. 4

The circuit of FIG. 4 is suitable for use in any of blocks 40–44 of FIG. 3. Assume that the circuit of FIG. 4 is being used as block 40. Inputs 60 and 74 are connected to outputs 22 and 23 of logic circuit 16 of FIG. 1. Accordingly, input terminals 60 and 74 correspond to inputs 45 and 46 of block 40. When there is no input pulse being provided by logic circuit 16, terminals 60 and 74 are both at approximately zero volts. When terminal 60 is at zero volts, transistor 63 is conducting so that current flows from potential source 67 through resistor 66, transistor 63, and resistor 64 to potential source 65. The collector of transistor 63 will be slightly positive. FET 71 is of a type which will be cut off or non-conducting when its gate-to-source voltage is positive. Since the source of FET 71 is connected to ground 57 through torque coil 12, FET 71 will be non-conducting.

When input terminal 74 is at zero volts, transistor 77 is non-conducting or cut off. The collector of transistor 77 will be positive and the gate-to-source voltage of FET 82 will be approximately zero volts. Accordingly, FET 82 will be non-conducting or cut off. Thus, torquer coil 12 will not receive any energization signal.

Assume that a positive pulse occurs at input terminal 60. The positive pulse will cause transistor 63 to become non-conducting or cut off. The collector of transistor 63 will become negative so that the gate-to-source voltage of FET 71 will become negative. FET 71 will begin conducting. Current will flow from ground 57 through torquer coil 12, FET 71, potentiometer 72, and resistor 73 to potential source 65. When the positive pulse at input terminal 60 ends, transistor 63 and FET 71 will return to their initial states or conditions. The magnitude of the pulse of current provided to torquer winding 12 is regulated by the size of resistor 73 and the setting of potentiometer 72.

Assume now that a positive pulse occurs at input terminal 74. Transistor 77 will be switched to a conducting state. The potential of the collector of transistor 77 will drop so that the gate-to-source voltage of FET 82 becomes negative. FET 82 switches to a conducting condition so that current flows from potential source 81 through FET 82, resistor 83, and potentiometer 84, and torquer coil 12 to ground 57. The magnitude of the pulse of current applied to torquer coil 12 is controlled by the size of resistor 83 and the setting of potentiometer 84. The positive pulse of current applied to torquer coil 12 when FET 82 conducts will not affect FET 71 because the gate voltage of FET 71 is slightly positive and the impedance of torquer coil 12 is relatively low.

In summary, when a logic pulse occurs at terminal 74, a positive pulse of current is applied to torquer coil 12. When a logic pulse occurs at terminal 60, a negative pulse of current is applied to torquer coil 12. The size or weight of the pulses of current are controlled by the resistors and potentiometers in the circuit. Thus, the circuit of FIG. 4 is a dual pulse forming circuit which forms either positive or negative weighted pulses depending upon the direction of the compensation desired.

OPERATION OF FIG. 3

In all inertial components non-linearities, errors or inaccuracies are introduced due to friction, drag of flex leads, and similar phenomena which introduce stray torques. These miscellaneous torques are compensated by the scale factor adjustment provided by block 40 of FIG. 3. These torques are generally of a type which oppose the precession of the gimbal. Since the number of pulses required to rebalance the gimbal is a measure of the amount of rotation or movement of the gimbal, the number of pulses required to rebalance the gimbal can be used to compensate for the miscellaneous torques when the rebalance pulses are properly scaled. Block 40 receives the logic pulses from logic circuit 16 of FIG. 1 and provides properly scaled current pulses to torquer coil 12. The scaling is provided by adjusting the potentiometers 72 and 84 of FIG. 4. While potentiometers are shown in FIG. 4, any suitable adjusting means may be used and once the proper setting of the potentiometers is determined experimentally, the potentiometers may be replaced by resistors of proper sizes. To determine the proper setting of potentiometers 72 and 84, the inertial platform may be mounted on a precision test table and the potentiometers adjusted until the proper amount of compensation is provided.

Referring to FIG. 5, there is shown a schematic of gyro housing 30 together with arrows indicating the input axis and output axis. A dashed line indicates the direction of the X axis. The X, Y, and Z coordinates refer to the platform orientation. When the X gyro is mounted on the platform, its input axis is generally aligned with the X platform direction. If the input axis is not exactly aligned with the X axis as indicated in FIG. 5, there is a misalignment of the input axis which is compensated by the outputs from blocks 41 and 42 of FIG. 3. The misalignment illustrated in FIG. 5 is greatly exaggerated for illustrative purposes. The alignment can be corrected mechanically, however, this correction is time consuming and expensive. For the purpose of explanation, assume that there is a slight misalignment in the Y direction and a slight misalignment in the Z direction. When the inertial platform is mounted on a precision test table and there is an input about the Y axis, the misalignment of the input axis of the X gyro in the Y direction will cause a small precession of the gimbal of the X gyro. This recession gives rise to an error which is compensated by the circuit in block 41. Since the logic pulses from the Y gyro are a measure of the amount of input about the Y axis, these pulses can be used to compensate the X gyro for misalignment along the Y axis. The amount of compensation needed is determined experimentally with the use of the precision test table by adjusting the potentiometer in block 41 until the X gyro does not provide an output in response to an input about the Y axis.

Similarly, block 42 of FIG. 3 is used to compensate for misalignment in the Z direction by providing properly scaled torque pulses to torquer coil 12 in response to logic pulses from the Z gyro. The procedure for determining the scaling is the same as was used for determining the scaling of the logic pulses from the Y gyro. An angular rate input is provided about the Z axis and the potentiometers in the circuit in block 42 are adjusted until there is no output from the X gyro or the output is within permissible limits.

Referring to FIG. 6, there is shown a schematic of a gimbal looking along the output axis. The center of mass of a gimbal must be on the output axis for mechanical precision. Assume the center of mass (CM) is slightly displaced from the output axis with components along the spin axis and input axis. If there is an acceleration in the X direction (along the input axis), there will be a torque about the output axis due to the mass unbalance along the spin axis. Similarly, if there is an acceleration in the direction of the spin axis, there will be another torque about the output axis due to the component of the mass unbalance along the input axis. Blocks 43 and 44 are used to compensate for these torques due to the mass unbalance assuming that the spin axis is aligned with the Y platform axis.

Since the logic signals from the S accelerometer are a measure of the acceleration in the X direction, these logic signals when properly scaled can be used to provide compensation for the mass unbalance along the spin axis. The amount of compensation required is determined experimentally with the use of a precision test table as above. An acceleration is applied in the X direction and the potentiometers in the pulse circuit in block 43 are adjusted to provide pulses of the proper amplitude for compensating for the torque due to the mass unbalance along the spin axis. Similarly, the pulse circuit in block 44 is adjusted experimentally to compensate for the mass unbalance along the input axis. The logic pulses from the Y accelerometer are used to compensate for the mass unbalance along the input axis since the spin axis is aligned in the Y platform direction. If the spin axis were aligned with the Z platform direction, the logic pulses from the Z accelerometer would be applied to block 44. Both plus and minus pulses are used to account for the direction of the acceleration.

From the above description of the compensation loop for the X gyro, anyone skilled in the art can determined how to compensate the Y and Z gyros. As was noted above, a platform ordinarily contains three gyros and three accelerometers. Those skilled in the art will realize that the accelerometers can also be compensated for mechanical inaccuracies and non-linearities with the use of similar apparatus The inaccuracies or errors to be compensated and the specific circuit construction generally depend upon the system requirements and the specific application of the invention is shown and described, those skilled in the art will realize that many modification can be made within the spirit and scope of the invention. Accordingly, the scope of the invention is to be limited only by the scope of the appended claims.

I claim as my invention:

1. An inertial platform having mounted thereon a plurality of inertial components each for sensing a particular condition, each having a rebalance loop including a primary torquer means and pulse producing means for producing pulses indicative of the sense and amplitude of the condition being sensed, and each further having an auxiliary torquer means connected to a compensation and alignment means which is connected to pulse producing means of selected inertial components and produces variable amplitude current pulses in response to the pulses indicative of the sense and amplitude of the conditions being sensed by said selected inertial components and applies the current pulses to the auxiliary torquer, for reducing errors due to mechanical inaccuracies of said inertial components.

2. A combination as defined in claim 1 wherein said compensation and alignment means for producing variable amplitude current pulses includes a plurality of pulse circuits, each pulse circuit being connected to one pulse producing means and to one auxiliary torquer means.

3. A combination as defined in claim 2 wherein said plurality of inertial components includes three gyroscopes for sensing angular rate and displacement and three accelerometers, said compensation and alignment means for producing variable amplitude current pulses includes at least five pulse circuits connected to the auxiliary torquer means of each gyroscope with each group of five pulse circuits being connected to receive pulses from the three gyroscopes and two selected ones of the three accelerometers.

4. In a navigation system:
   a platform;
   a first gyro mounted on the platform, having its inputs spring and output axes oriented in the X, Y and Z directions, respectively, of a 3-axis coordinate system, the gyro including a first and second torquing means, the gyro generating a signal which is indicative of a condition with respect to its input axis;

logic means for generating first and second sets of pulses in accordance with the polarity and amplitude of the signal generated by the gyro;

a switching bridge means, including a current source, operated by the first set of pulses and providing pulses of current to the first torquing means for rebalancing the gyro;

a second gyro means mounted on the platform, having its input axis oriented in the Y direction, and including means for generating a third set of pulses in accordance with the polarity and amplitude of a signal which is indicative of a condition with respect to the input axis of the second gyro means;

a third gyro means mounted on the platform, having is input axis oriented in the Z direction and including means for generating a fourth set of pulses in accordance with the polarity and amplitude of a signal which is indicative of a condition with respect to the input axis of the third gyro means, first accelerometer means mounted on the platform, having its input axis oriented in the X direction, and including means for generating a fifth set of pulses in accordance with the polarity and amplitude of a signal which is indicative of a condition with respect to the input axis of the first accelerometer means;

a second accelerometer means mounted on the platform, having its input axis oriented in the Y direction, and including means for generating a sixth set of pulses in accordance with the polarity and amplitude of a signal which is in indicative of a condition with respect to the input axis of the second accelerometer means; and a compensation and alignment circuit means for applying the second, third, fourth, fifth and sixth sets of pulses in parallel to the second torquing means including means for varying the amplitudes of the various applied sets of pulses.

* * * * *

UNITED STATES PATENT OFFICE
CERTIFICATE OF CORRECTION

Patent No. 3,713,335            Dated   January 30, 1973

Inventor(s) Thomas E. Dupuis, Jr.

It is certified that error appears in the above-identified patent and that said Letters Patent are hereby corrected as shown below:

Claim 4, line 4, cancel "puts spring" and substitute --put, spin,--;

line 24, cancel "is" and substitute --its--;

line 40, cancel "in".

Signed and sealed this 10th day of July 1973.

(SEAL)
Attest:

EDWARD M. FLETCHER, JR.           Rene Tegtmeyer
Attesting Officer                 Acting Commissioner of Patents